(12) United States Patent
Karasawa

(10) Patent No.: US 6,768,129 B2
(45) Date of Patent: Jul. 27, 2004

(54) RADIATION IMAGE READ-OUT METHOD AND APPARATUS

(75) Inventor: Hiroyuki Karasawa, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 195 days.

(21) Appl. No.: 09/943,352

(22) Filed: Aug. 31, 2001

(65) Prior Publication Data
US 2002/0024030 A1 Feb. 28, 2002

(30) Foreign Application Priority Data
Aug. 31, 2000 (JP) ........................................ 2000-262857

(51) Int. Cl.⁷ .............................................. G03B 42/08
(52) U.S. Cl. .......................... 250/584; 250/585; 250/586
(58) Field of Search ................................ 250/586, 585, 250/584

(56) References Cited

U.S. PATENT DOCUMENTS

| 4,767,927 | A | * | 8/1988 | Ohyama et al. | ............ 250/586 |
| 4,778,994 | A | * | 10/1988 | Conrad et al. | ............... 250/586 |
| 4,778,995 | A | * | 10/1988 | Kulpinski et al. | .......... 250/586 |
| 4,816,679 | A | | 3/1989 | Sunagawa et al. | |
| 4,922,103 | A | | 5/1990 | Kawajiri et al. | |
| 5,039,854 | A | * | 8/1991 | Yip et al. | .................... 250/586 |

FOREIGN PATENT DOCUMENTS

| JP | 60-111568 | 6/1985 | ............ H04N/1/04 |
| JP | 60-236354 | 11/1985 | ............ H04N/1/04 |
| JP | 1-101540 | 4/1989 | ........... G03B/42/02 |

OTHER PUBLICATIONS

Patent Abstract of Japan 01–101540 Apr. 19, 1989.

* cited by examiner

Primary Examiner—Constantine Hannaher
(74) Attorney, Agent, or Firm—Sughrue Mion, PLLC

(57) ABSTRACT

Stimulating rays are linearly irradiated onto an area of a stimulable phosphor sheet. Light emitted by the sheet is received with one surface of a light guide device, which is located such that the one surface stands facing the linear area of the sheet exposed to the linear stimulating rays. The emitted light, which has thus been received, is guided through the light guide device toward end faces of the light guide device. The emitted light, which has been radiated out from at least one end face of the light guide device, is detected with a line sensor comprising photoelectric conversion devices arrayed along the at least one end face of the light guide device.

32 Claims, 6 Drawing Sheets

F I G . 9
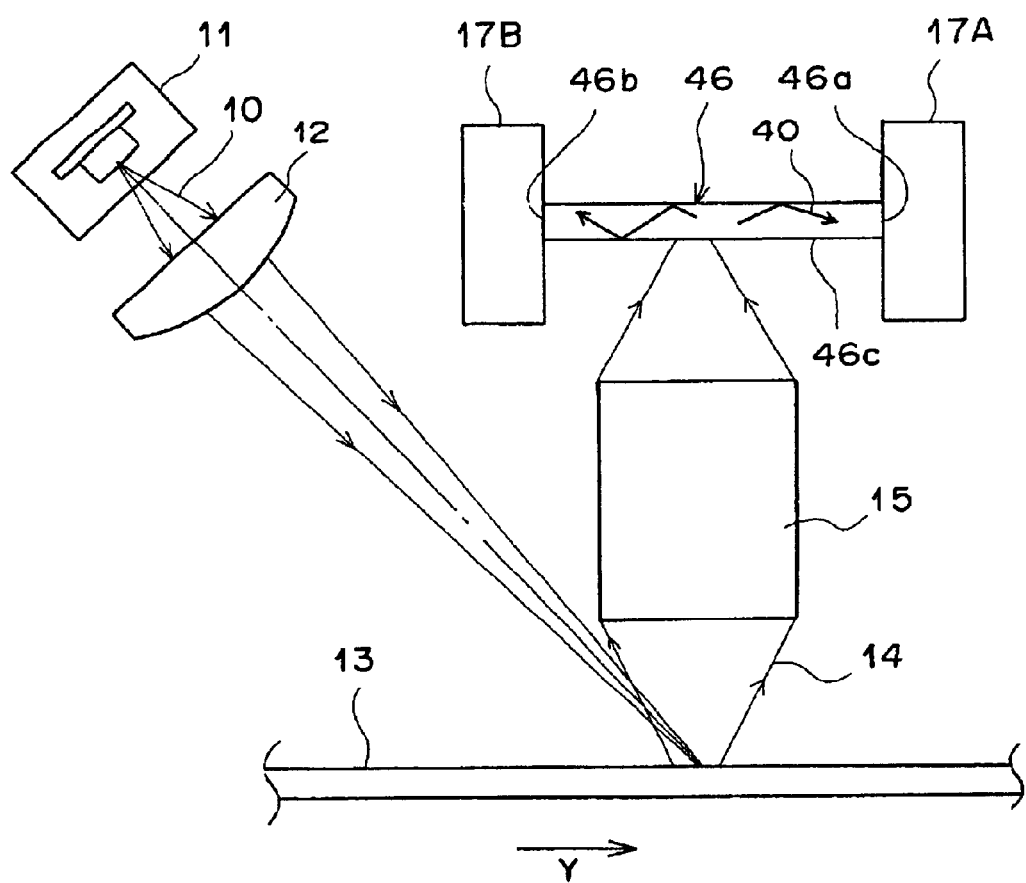

RADIATION IMAGE READ-OUT METHOD AND APPARATUS

BACKGROUND OF THE INVENTION

1. Field of the Invention

This invention relates to a radiation image read-out method and apparatus, wherein stimulating rays are irradiated to a stimulable phosphor sheet, on which a radiation image has been stored, and light, which is emitted by the stimulable phosphor sheet when the stimulable phosphor sheet is exposed to the stimulating rays, is photoelectrically detected, an image signal representing the radiation image being thereby obtained. This invention particularly relates to a radiation image read-out method and apparatus, wherein the stimulating rays are linearly irradiated to the stimulable phosphor sheet, and the light emitted by the stimulable phosphor sheet is detected with a line sensor.

2. Description of the Related Art

Radiation image recording and reproducing systems, wherein a stimulable phosphor sheet, which comprises a substrate and a layer of a stimulable phosphor overlaid on the substrate, have heretofore been widely used in practice.

With the radiation image recording and reproducing systems, a stimulable phosphor sheet is exposed to radiation carrying image information of an object, such as a human body, and a radiation image of the object is thereby recorded on the stimulable phosphor sheet. Thereafter, stimulating rays, such as a laser beam, are caused to scan the stimulable phosphor sheet in two-dimensional directions. The stimulating rays cause an exposed area of the stimulable phosphor sheet to emit light in proportion to the amount of energy stored thereon during its exposure to the radiation. The light emitted from the exposed area of the stimulable phosphor sheet, upon stimulation thereof, is photoelectrically detected and converted into an electric image signal by photoelectric read-out means.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or displaying a visible image for diagnosis, or the like, on a cathode ray tube (CRT) display device. In cases where the stimulable phosphor sheet, from which the image signal has been detected, is then exposed to erasing light, and energy remaining on the stimulable phosphor sheet is thereby released, the erased stimulable phosphor sheet is capable of being used again for the recording of a radiation image.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, wherein a novel type of stimulable phosphor sheet is utilized, has been proposed in, for example, Japanese Patent Application No. 11(1999)-372978. With the novel type of the stimulable phosphor sheet utilized in the proposed radiation image recording and reproducing system, the radiation absorbing functions and the energy storing functions of the conventional stimulable phosphor sheet are separated from each other.

The novel type of the stimulable phosphor sheet utilized in the proposed radiation image recording and reproducing system contains a layer of a stimulable phosphor for energy storage, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The novel type of the stimulable phosphor sheet should preferably take on the form combined with a layer of a phosphor for radiation absorption, which is capable of absorbing radiation and being caused to emit light having wavelengths falling within an ultraviolet to visible region. In such cases, energy from the light having wavelengths falling within the ultraviolet to visible region, which light is emitted from the layer of the phosphor for radiation absorption when the layer of the phosphor for radiation absorption is exposed to the radiation carrying image information of an object, (the amount of the energy corresponding to the radiation image information) is stored on the layer of the stimulable phosphor for energy storage. When the stimulable phosphor sheet, on which the radiation image has thus been stored, is scanned with the stimulating rays, the light carrying the radiation image information is emitted from the layer of the stimulable phosphor for energy storage.

The novel type of the stimulable phosphor sheet need not necessarily be provided with the layer of the phosphor for radiation absorption. In such cases, the novel type of the stimulable phosphor sheet is utilized in combination with a fluorescent screen, which is provided with the layer of the phosphor for radiation absorption capable of absorbing radiation and being caused to emit the light having wavelengths falling within the ultraviolet to visible region.

Specifically, in such cases, the fluorescent screen is kept in close contact with the novel type of the stimulable phosphor sheet, and the radiation carrying the image information of the object is irradiated to the fluorescent screen. As a result, the light having wavelengths falling within the ultraviolet to visible region is emitted from the layer of the phosphor for radiation absorption of the fluorescent screen. Also, energy from the light emitted from the phosphor for radiation absorption (the amount of the energy corresponding to the radiation image information) is stored on the layer of the stimulable phosphor for energy storage of the stimulable phosphor sheet. When the stimulable phosphor sheet, on which the radiation image has thus been stored, is scanned with the stimulating rays, the light carrying the radiation image information is emitted from the layer of the stimulable phosphor for energy storage.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line sensor comprising a charge coupled device (CCD) image sensor, or the like, is utilized as the photoelectric read-out means.

Basically, the radiation image read-out apparatuses of such types comprise:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction (a sub-scanning direction), which is approximately normal to a length direction of the linear area of the stimulable phosphor sheet exposed to the linear stimulating rays (a main scanning direction).

The stimulating ray irradiating means for linearly irradiating the stimulating rays onto the stimulable phosphor sheet in the manner described above may be constituted so as to produce fan beam-like stimulating rays. Alternatively, the stimulating ray irradiating means may be constituted so as to deflect a thin beam and to cause the deflected thin beam to linearly scan the stimulable phosphor sheet.

However, with the conventional radiation image read-out apparatuses, wherein the stimulating ray irradiating means, which linearly irradiates the stimulating rays to the stimulable phosphor sheet, and the line sensor are utilized, the problems have heretofore been encountered in that an efficiency, with which the light emitted by the stimulable phosphor sheet is collected, cannot be kept high.

SUMMARY OF THE INVENTION

The primary object of the present invention is to provide a radiation image read-out method, in which stimulating ray irradiating means and a line sensor are utilized, wherein an efficiency, with which light emitted by a stimulable phosphor sheet is collected, is capable of being kept high.

Another object of the present invention is to provide an apparatus for carrying out the radiation image read-out method.

A first radiation image read-out method in accordance with the present invention is characterized by guiding light, which has been emitted by a stimulable phosphor sheet, with a light guide device, which receives the emitted light with one surface and guides the emitted light toward end faces, and receiving the guided light with a line sensor, an efficiency with which the emitted light is collected being thereby enhanced. Specifically, the present invention provides a first radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device, iii) detecting the emitted light, which has been radiated out from at least one end face of the light guide device, with a line sensor, which comprises a plurality of photoelectric conversion devices arrayed along the at least one end face of the light guide device, and iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays.

A second radiation image read-out method in accordance with the present invention is characterized by guiding light, which has been emitted by a stimulable phosphor sheet, with a light guide device (i.e., a fluorescent light guide device), which receives the emitted light with one surface, converts the emitted light into fluorescence, and guides the fluorescence toward end faces, and receiving the guided fluorescence with a line sensor, an efficiency with which the emitted light is collected being thereby enhanced. Specifically, the present invention also provides a second radiation image read-out method, comprising the steps of:

i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation, ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being converted by the light guide device into fluorescence, the fluorescence being guided through the light guide device toward end faces of the light guide device, iii) detecting the fluorescence, which has been radiated out from at least one end face of the light guide device, with a line sensor, which comprises a plurality of photoelectric conversion devices arrayed along the at least one end face of the light guide device, the emitted light being thereby detected indirectly, and iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays.

In the second radiation image read-out method in accordance with the present invention, the intensity of the fluorescence is in proportion to the intensity of the light emitted by the stimulable phosphor sheet. Therefore, in cases where the intensity of the fluorescence is detected with the line sensor, the intensity of the light emitted by the stimulable phosphor sheet, i.e. the radiation image having been stored on the stimulable phosphor sheet, is capable of being detected.

Each of the first and second radiation image read-out methods in accordance with the present invention should preferably be modified such that each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and outputs of photoelectric conversion devices of the two line sensors, which photoelectric conversion devices correspond to an identical site on the linear area of the stimulable phosphor sheet exposed to the linear stimulating rays, are added to each other. (As for the second radiation image read-out method in accordance with the present invention, the term "detecting emitted light" as used herein means that the emitted light is detected indirectly through the detection of the fluorescence.)

Alternatively, each of the first and second radiation image read-out methods in accordance with the present invention may be modified such that the line sensor is located at one end face of the light guide device, such that the line sensor is capable of detecting the light, which is emitted from an approximately overall length of the linear area of the stimulable phosphor sheet exposed to the linear stimulating rays, and an end face of the light guide device, the end face being located on a side opposite to the one end face at which the line sensor is located, is formed as a light reflecting surface.

As another alternative, each of the first and second radiation image read-out methods in accordance with the present invention may be modified such that at least one line sensor is located at a region of one end face of the light guide device, such that the at least one line sensor is capable of detecting the light, which is emitted from a subarea of the linear area of the stimulable phosphor sheet exposed to the linear stimulating rays, a region of the one end face of the light guide device, at which region no line sensor is located, is formed as a light reflecting surface, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as a light reflecting surface.

Also, each of the first and second radiation image read-out methods in accordance with the present invention should preferably be modified such that the light guide device is divided into pixels, which are arrayed along an array direction of the photoelectric conversion devices of the line sensor and at a pitch identical with an array pitch of the photoelectric conversion devices.

Further, each of the first and second radiation image read-out methods in accordance with the present invention should preferably be modified such that the light, which has been emitted from the linear area of the stimulable phosphor sheet exposed to the linear stimulating rays, is collected with a light collecting optical system, and the emitted light, which has thus been collected, is guided by the light collecting optical system toward the light guide device.

In such cases, each of the first and second radiation image read-out methods in accordance with the present invention should more preferably be modified such that the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

Furthermore, in each of the first and second radiation image read-out methods in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with a layer of a stimulable phosphor for energy storage.

In cases where the stimulable phosphor sheet is a stimulable phosphor sheet provided with the layer of the stimulable phosphor for energy storage, the stimulable phosphor sheet may also be provided with a layer of a phosphor for radiation absorption. Alternatively, in such cases, the stimulable phosphor sheet may not be provided with the layer of the phosphor for radiation absorption and may be utilized in combination with a fluorescent screen having the layer of the phosphor for radiation absorption.

As will be understood from the specification, it should be noted that the term "moving a stimulable phosphor sheet with respect to stimulating ray irradiating means, a light guide device, and a line sensor" as used herein means movement of the stimulable phosphor sheet relative to the stimulating ray irradiating means, the light guide device, and the line sensor, and embraces the cases wherein the stimulable phosphor sheet is moved while the stimulating ray irradiating means, the light guide device, and the line sensor are kept stationary, the cases wherein the stimulating ray irradiating means, the light guide device, and the line sensor are moved while the stimulable phosphor sheet is kept stationary, and the cases wherein both the stimulable phosphor sheet and the stimulating ray irradiating means, the light guide device, and the line sensor are moved. In cases where the stimulating ray irradiating means, the light guide device, and the line sensor are moved, they should be moved together with one another.

The present invention further provides an apparatus for carrying out the first radiation image read-out method in accordance with the present invention. Specifically, the present invention further provides a first radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating grays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays.

The present invention still further provides an apparatus for carrying out the second radiation image read-out method in accordance with the present invention. Specifically, the present invention still further provides a second radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating grays, the light guide device receiving the light, which has been emitted from the linear area of the stimulable phosphor sheet exposed to the linear stimulating rays, with the one surface of the light guide device, converting the emitted light, which has thus been received, into fluorescence, and guiding the fluorescence toward end faces of the light guide device, iii) a line sensor, which comprises a plurality of photoelectric conversion devices arrayed along at least one end face of the light guide device, the line sensor detecting the fluorescence, which has been radiated out from the at least one end face of the light guide device, and thereby indirectly detecting the emitted light, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays.

Each of the first and second radiation image read-out apparatuses in accordance with the present invention should preferably be modified such that each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and the apparatus further comprises addition processing means for performing addition processing on outputs of photoelectric conversion devices of the two line sensors, which photoelectric conversion devices correspond to an identical site on the linear area of the stimulable phosphor sheet exposed to the linear stimulating rays. (As for the second radiation image read-out apparatus in accordance with the present invention, the term "detecting emitted light" as used here in means that the emitted light is detected indirectly through the detection of the fluorescence.)

Alternatively, each of the first and second radiation image read-out apparatuses in accordance with the present invention may be modified such that the line sensor is located at one end face of the light guide device, such that the line sensor is capable of detecting the light, which is emitted from an approximately overall length of the linear area of the stimulable phosphor sheet exposed to the linear stimulating rays, and an end face of the light guide device, the end face being located on a side opposite to the one end face at which the line sensor is located, is formed as a light reflecting surface.

As another alternative, each of the first and second radiation image read-out apparatuses in accordance with the present invention may be modified such that at least one line sensor is located at a region of one end face of the light guide device, such that the at least one line sensor is capable of detecting the light, which is emitted from a subarea of the linear area of the stimulable phosphor sheet exposed to the linear stimulating rays, a region of the one end face of the light guide device, at which region no line sensor is located, is formed as a light reflecting surface, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as a light reflecting surface.

Also, each of the first and second radiation image read-out apparatuses in accordance with the present invention should preferably be modified such that the light guide device is divided into pixels, which are arrayed along an array direction of the photoelectric conversion devices of the line sensor and at a pitch identical with an array pitch of the photoelectric conversion devices.

Further, each of the first and second radiation image read-out apparatuses in accordance with the present invention should preferably be modified such that the apparatus further comprises a light collecting optical system, which is located between the stimulable phosphor sheet and the light guide device, the light collecting optical system collecting the light, which has been emitted from the linear area of the stimulable phosphor sheet exposed to the linear stimulating rays, and guiding the emitted light, which has thus been collected, toward the light guide device.

In such cases, each of the first and second radiation image read-out apparatuses in accordance with the present invention should more preferably be modified such that the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

Furthermore, in each of the first and second radiation image read-out apparatuses in accordance with the present invention, the stimulable phosphor sheet may be a stimulable phosphor sheet having both the functions for radiation absorption and the functions for energy storage. Alternatively, the stimulable phosphor sheet may be a stimulable phosphor sheet provided with a layer of a stimulable phosphor for energy storage.

In cases where the stimulable phosphor sheet is a stimulable phosphor sheet provided with the layer of the stimulable phosphor for energy storage, the stimulable phosphor sheet may also be provided with a layer of a phosphor for radiation absorption. Alternatively, in such cases, the stimulable phosphor sheet may not be provided with the layer of the phosphor for radiation absorption and may be utilized in combination with a fluorescent screen having the layer of the phosphor for radiation absorption.

The inventors conducted extensive research and found that the problems with regard to a low efficiency, with which the light emitted by the stimulable phosphor sheet is collected, occur due to the problems in that a light receiving width of a CCD line sensor, or the like, which light receiving width is taken in the direction approximately normal to the array direction of the photoelectric conversion devices constituting the CCD line sensor, or the like is smaller than a light emission width on the stimulable phosphor sheet, which light emission width is taken in the sub-scanning direction.

Specifically, ordinarily, the light receiving width of the CCD line sensor, or the like, which light receiving width is taken in the sub-scanning direction, is at most approximately 25 µm. Also, ordinarily, the light emission width on the stimulable phosphor sheet, which light emission width is taken in the sub-scanning direction, falls within the range of approximately 100 µm to approximately 500 µm. In the conventional radiation image read-out apparatuses, wherein an erect equi-magnification optical system is employed as the optical system for collecting the light emitted by the stimulable phosphor sheet, the width of the emitted light, which impinges upon the light receiving surface of the line sensor, falls within the range of approximately 100 µm to approximately 500 µm. Therefore, a large portion of the emitted light impinges upon positions outward from the light receiving surface of the line sensor.

However, with the first radiation image read-out method and apparatus in accordance with the present invention, the light having been emitted by the stimulable phosphor sheet is caused to enter from the surface of the light guide device into the light guide device and is guided through the light guide device toward the end faces of the light guide device. Therefore, in cases where the width of the surface of the light guide device is set to be comparatively large, the light, which has been emitted with the large light emission width from the stimulable phosphor sheet, is capable of efficiently impinging upon the surface of the light guide device. Also, the emitted light, which has been radiated out from the at least one end face of the light guide device, is received by the line sensor. Therefore, in cases where the thickness of the end face of the light guide device is set to be approximately identical with the light receiving width of the line sensor or slightly smaller than the light receiving width of the line sensor, a large portion of the emitted light, which has been radiated out from the end face of the light guide device, or approximately all of the emitted light is capable of being received by the line sensor.

With the second radiation image read-out method and apparatus in accordance with the present invention, the light having been emitted by the stimulable phosphor sheet is caused to enter from the surface of the light guide device into the light guide device. Therefore, in cases where the width of the surface of the light guide device is set to be comparatively large, the light, which has been emitted with the large light emission width from the stimulable phosphor sheet, is capable of efficiently impinging upon the surface of the light guide device.

Also, with the second radiation image read-out method and apparatus in accordance with the present invention, the emitted light, which has entered into the light guide device, is converted by the light guide device into the fluorescence. The fluorescence is guided through the light guide device toward the end faces of the light guide device, and the fluorescence, which has been radiated out from the at least one end face of the light guide device, is received by the line sensor. Therefore, in cases where the thickness of the end face of the light guide device is set to be approximately identical with the light receiving width of the line sensor or slightly smaller than the light receiving width of the line sensor, a large portion of the fluorescence, which has been radiated out from the end face of the light guide device, or approximately all of the fluorescence is capable of being received by the line sensor.

As described above, with the first radiation image read-out method and apparatus in accordance with the present invention and the second radiation image read-out method and apparatus in accordance with the present invention, the efficiency, with which the light emitted by the stimulable phosphor sheet is collected, is capable of being kept markedly higher than with the conventional radiation image read-out apparatuses. Therefore, a read-out image signal having a high signal-to-noise ratio is capable of being obtained, and a radiation image having good image quality is capable of being reproduced.

The first radiation image read-out method and apparatus in accordance with the present invention and the second radiation image read-out method and apparatus in accordance with the present invention may be modified such that each of two line sensors is located at one of two end faces of the light guide device, which end faces stand facing each other, such that each of the two line sensors is capable of detecting the light, which is emitted from an approximately over all length of the linear area of the stimulable phosphor sheet exposed to the linear stimulating rays. Also, in such cases, the outputs of the photoelectric conversion devices of the two line sensors, which photoelectric conversion devices correspond to an identical site on the linear area of the stimulable phosphor sheet exposed to the linear stimulating rays, are added to each other. With the modifications described above, the emitted light, which has entered into the light guide device and has traveled toward one of the two end faces of the light guide device, or the fluorescence, which has been produced from excitation with the emitted light within the light guide device and has traveled toward one of the two end faces of the light guide device, is detected by the line sensor, which is located at the one end face of the light guide device. Also, the emitted light, which has entered into the light guide device and has traveled toward the other end face of the light guide device, or the fluorescence, which has been produced from the excitation with the emitted light within the light guide device and has traveled toward the other end face of the light guide device, is detected by the line sensor, which is located at the other end face of the light guide device.

Therefore, in cases where the outputs of the photoelectric conversion devices of the two line sensors, which photoelectric conversion devices correspond to an identical site on the linear area of the stimulable phosphor sheet exposed to the linear stimulating rays, are added to each other, the total sum of the intensity of the emitted light, which has traveled toward the one end face of the light guide device, and the intensity of the emitted light, which has traveled toward the other end face of the light guide device, or the total sum of the intensity of the fluorescence, which has traveled toward the one end face of the light guide device, and the intensity of the fluorescence, which has traveled toward the other end face of the light guide device, is capable of being obtained. Accordingly, the efficiency, with which the light emitted by the stimulable phosphor sheet or the fluorescence is detected, is capable of being enhanced. In the second radiation image read-out method and apparatus in accordance with the present invention, the fluorescence is detected, and the emitted light is thus detected indirectly. Therefore, in the cases of the second radiation image read-out method and apparatus in accordance with the present invention, the enhancement of the efficiency, with which the fluorescence is detected, leads to the enhancement of the efficiency, with which the light emitted by the stimulable phosphor sheet is detected.

Also, the first radiation image read-out method and apparatus in accordance with the present invention and the second radiation image read-out method and apparatus in accordance with the present invention may be modified such that the line sensor is located at one end face of the light guide device, such that the line sensor is capable of detecting the light, which is emitted from an approximately overall length of the linear area of the stimulable phosphor sheet exposed to the linear stimulating rays. Further, in such cases, an end face of the light guide device, the end face being located on a side opposite to the one end face at which the line sensor is located, is formed as the light reflecting surface. With the modifications described above, the emitted light, which has entered into the light guide device and has traveled toward the side opposite to line sensor, or the fluorescence, which has been produced from excitation with the emitted light within the light guide device and has traveled toward the side opposite to the line sensor, is reflected from the light reflecting surface toward the line sensor. Therefore, the emitted light or the fluorescence is capable of being efficiently detected by the line sensor.

Further, the first radiation image read-out method and apparatus in accordance with the present invention and the second radiation image read-out method and apparatus in accordance with the present invention may be modified such that at least one line sensor is located at a region of one end face of the light guide device, such that the at least one line sensor is capable of detecting the light, which is emitted from a subarea of the linear area of the stimulable phosphor sheet exposed to the linear stimulating rays, and a region of the one end face of the light guide device, at which region no line sensor is located, is formed as the light reflecting surface. Also, in such cases, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as the light reflecting surface. With the modifications described above, the light reflecting surface is formed at the region of the end face of the light guide device, which region stands facing the line sensor located at the region of the opposite end face of the light guide device. Therefore, the emitted light, which has entered into the light guide device and has traveled toward the side opposite to line sensor, or the fluorescence, which has been produced from excitation with the emitted light within the light guide device and has traveled toward the side opposite to the line sensor, is reflected from the light reflecting surface toward the line sensor. Accordingly, the emitted light or the fluorescence is capable of being efficiently detected by the line sensor.

Furthermore, the first radiation image read-out method and apparatus in accordance with the present invention and the second radiation image read-out method and apparatus in accordance with the present invention may be modified such that the light, which has been emitted from the linear area of the stimulable phosphor sheet exposed to the linear stimulating rays, is collected with the light collecting optical system, and the emitted light, which has thus been collected, is guided by the light collecting optical system toward the light guide device. With the modifications described above, the light emitted by the stimulable phosphor sheet is capable of being collected and detected more efficiently. In particular, such effects are capable of being obtained markedly in cases where a plurality of light collecting optical systems are utilized.

BRIEF DESCRIPTION OF THE DRAWINGS

FIG. 9 is a side view showing a read-out optical system employed in a fifth embodiment of the radiation image read-out apparatus in accordance with the present invention.

DESCRIPTION OF THE PREFERRED EMBODIMENTS

The present invention will hereinbelow be described in further detail with reference to the accompanying drawings.

Figure 1:
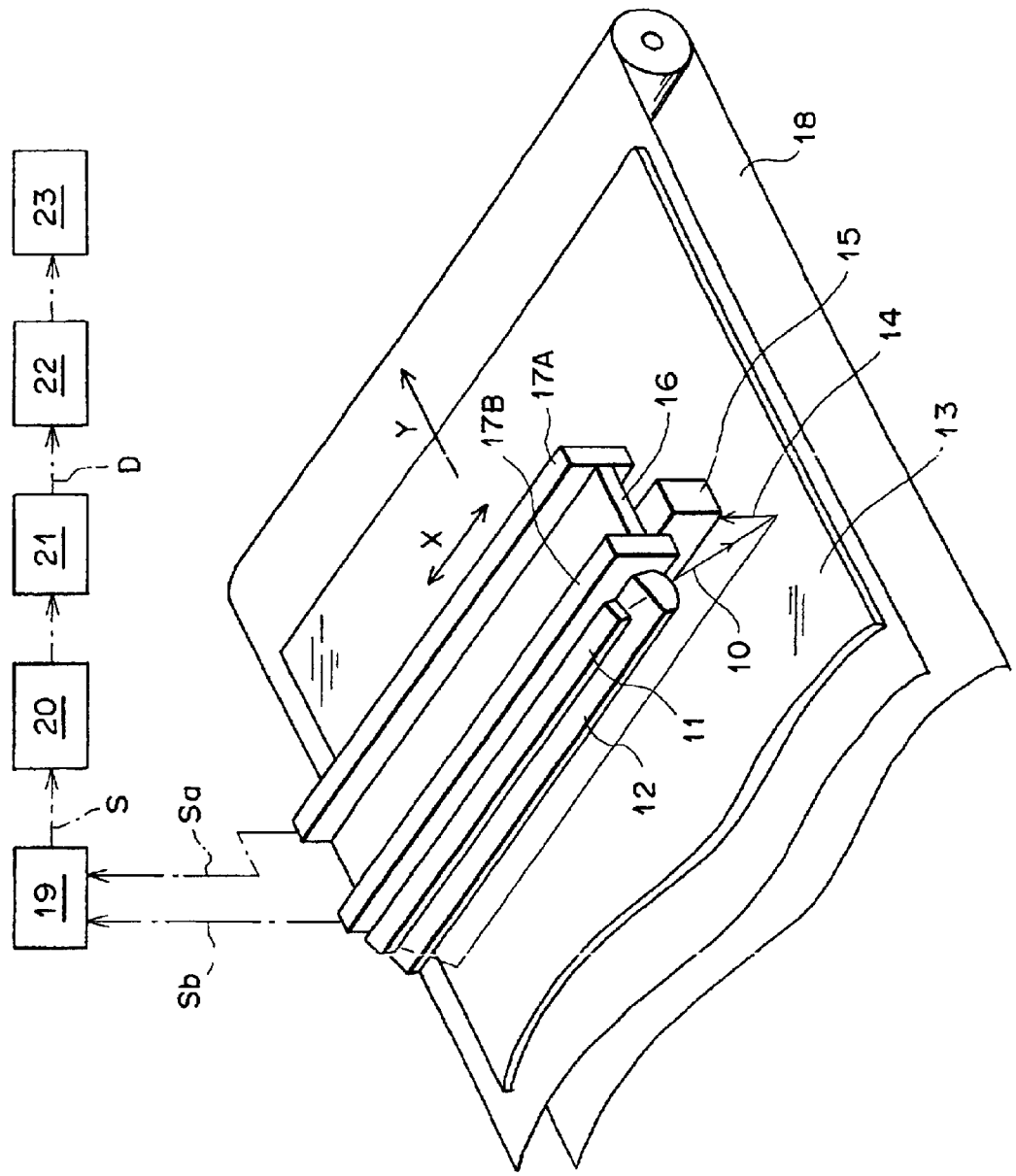
FIG. 1 is a perspective view showing a first embodiment of the radiation image read-out apparatus in accordance with the present invention.
Figure 2:
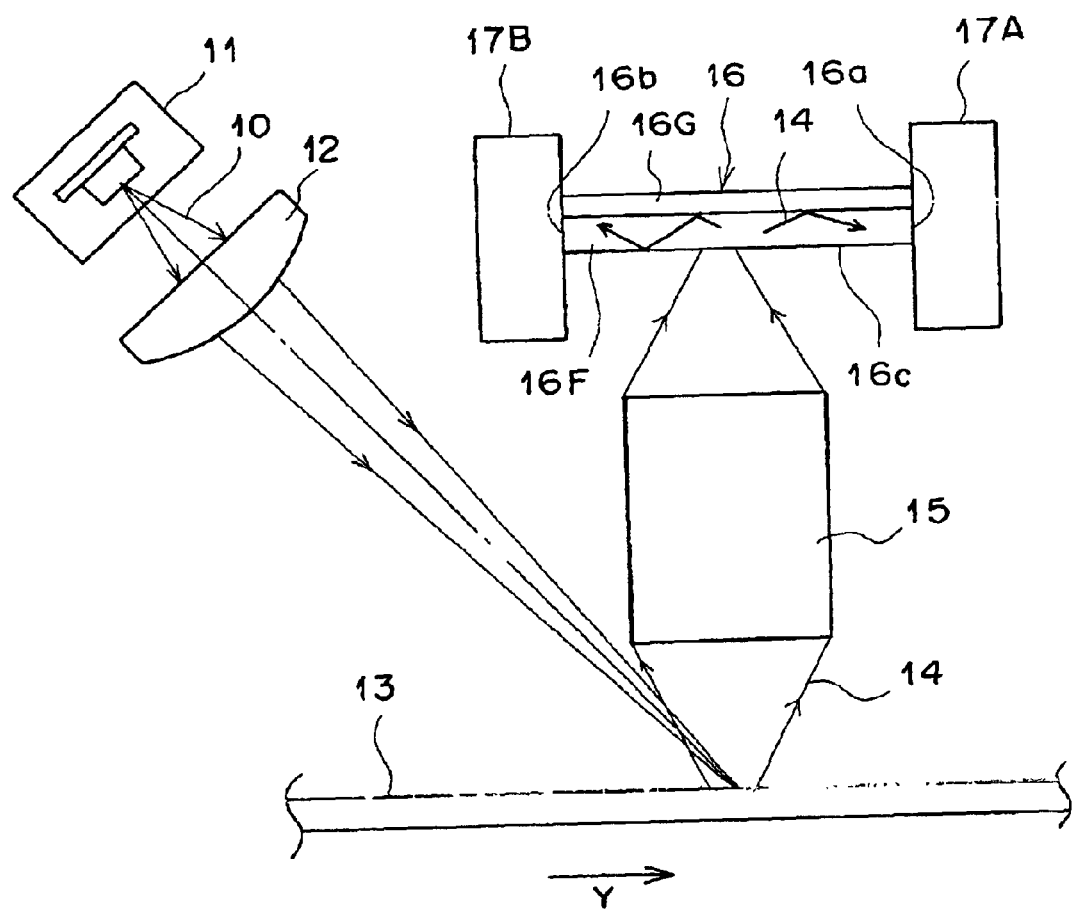
FIG. 2 is a side view showing a read-out optical system employed in the first embodiment of FIG. 1.
Figure 3:
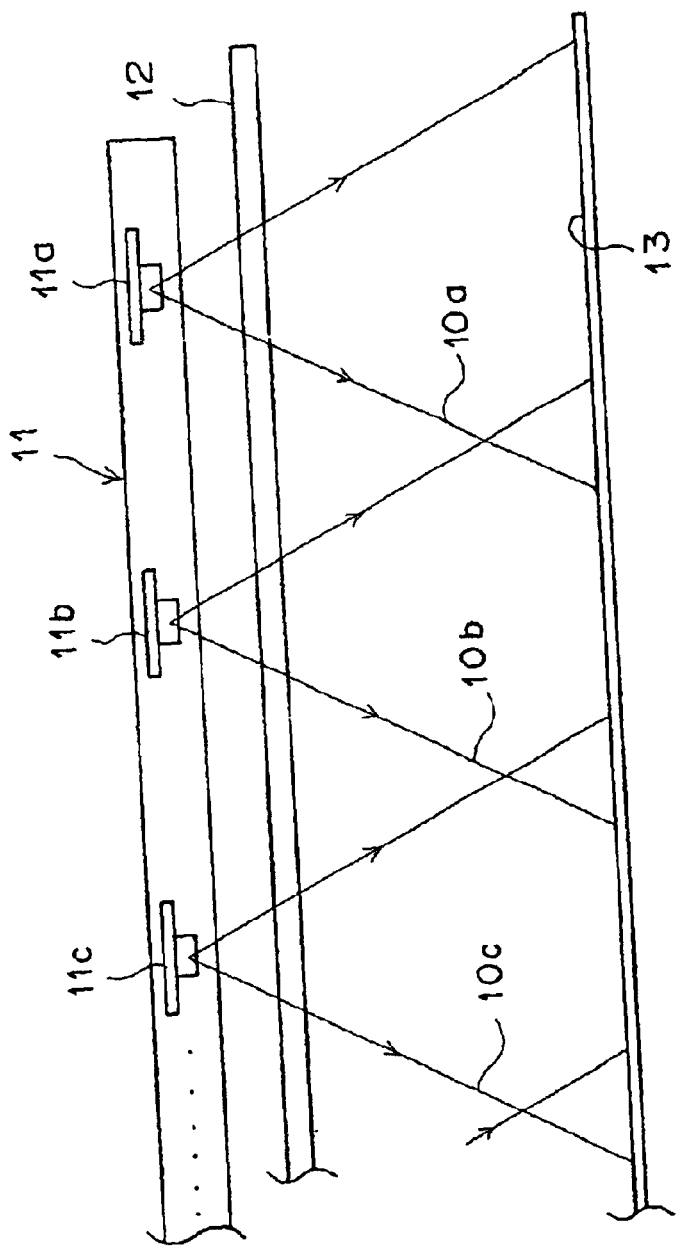
FIG. 3 is a front view showing the read-out optical system of FIG. 2.

FIG. 1 is a perspective view showing a first embodiment of the radiation image read-out apparatus in accordance with the present invention. FIG. 2 is a side view showing a read-out optical system employed in the first embodiment of FIG. 1. FIG. 3 is a front view showing the read-out optical system of FIG. 2.

As illustrated in FIG. 1, the radiation image read-out apparatus comprises a laser diode array 11 acting as the stimulating ray irradiating means for producing fan beam-like stimulating rays 10. The radiation image read-out apparatus also comprises a cylindrical lens 12 for converging the stimulating rays 10 only in the plane of the sheet of FIG. 2 in order to form linear stimulating rays 10. The radiation image read-out apparatus further comprises a lens array 15 for collecting light 14, which has been emitted from a linear area of a stimulable phosphor sheet 13 exposed to the linear stimulating rays 10. The radiation image read-out apparatus still further comprises a thin light guide device 16, which is located such that one surface 16c receives the emitted light 14 having passed through the lens array 15. The radiation image read-out apparatus also comprises a CCD line sensor 17A, which is located such that it is in close contact with an end face 16a of the light guide device 16, and a CCD line sensor 17B, which is located such that it is in close contact with an end face 16b of the light guide device 16. The radiation image read-out apparatus further comprises an endless belt 18, which acts as sub-scanning means for moving the stimulable phosphor sheet 13 at a predetermined speed and in the direction indicated by the arrow Y, which direction is normal to the length direction of the linear area of the stimulable phosphor sheet 13 exposed to the linear stimulating rays 10 (the length direction being indicated by the double headed arrow X).

The radiation image read-out apparatus still further comprises an addition processing circuit 19 for performing addition processing on an analog light detection signal Sa, which has been fed out from the CCD line sensor 17A, and an analog light detection signal Sb, which has been fed out from the CCD line sensor 17B. The radiation image read-out apparatus also comprises an amplifier 20 for amplifying an addition-processed light detection signal S, which has been fed out from the addition processing circuit 19. The radiation image read-out apparatus further comprises an analog-to-digital converter 21 for digitizing the addition-processed light detection signal S, which has been amplified by the amplifier 20, into a digital image signal D. The digital image signal D, which has been obtained from the analog-to-digital converter 21, is fed into an image processing unit 22, which performs image processing on the digital image signal D. The digital image signal D, which has been obtained from the image processing performed by the image processing unit 22, is fed into an image reproducing apparatus 23.

As illustrated in FIG. 3, the laser diode array 11 comprises a plurality of laser diodes 11a, 11b, 11c, . . . arrayed in a line. By way of example, each of the laser diodes 11a, 11b, 11c, . . . produces a laser beam (the stimulating rays) having wavelengths falling within the range of 650 nm to 690 nm. The laser diodes 11a, 11b, 11c, . . . respectively produce stimulating rays 10a, 10b, 10c, . . . in a divergent light state. The stimulating rays 10a, 10b, 10c, . . . , which have been produced by the laser diodes 11a, 11b, 11c, . . . , are converged by the cylindrical lens 12 with respect to only one direction and into fan beams. The stimulating rays 10, which are composed of the fan beams standing in a row, are linearly irradiated onto the linear area of the stimulable phosphor sheet 13.

Figure 5:
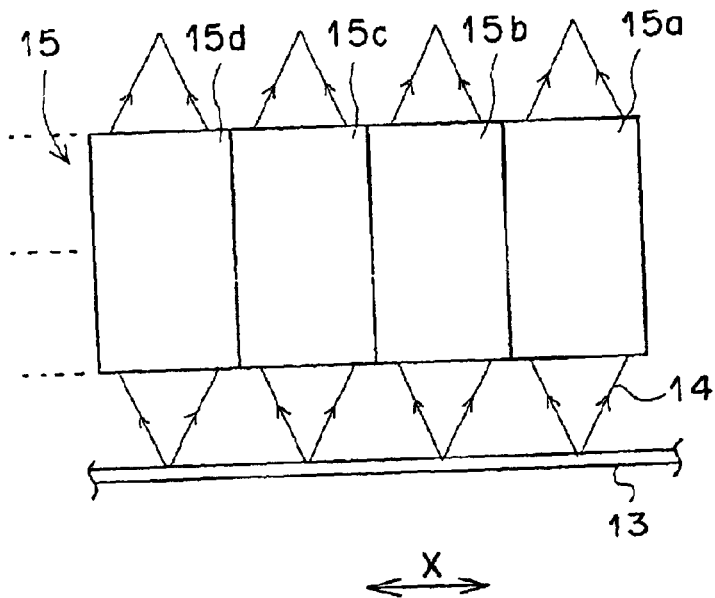
FIG. 5 is a front view showing a lens array employed in the first embodiment of FIG. 1.

FIG. 5 is a front view showing the lens array 15 employed in the first embodiment of FIG. 1. As illustrated in FIG. 5, the lens array 15 comprises, for example, a plurality of distributed index lenses 15a, 15b, 15c, 15d, . . . , which are arrayed in a line. The lens array 15 is located in an orientation such that the distributed index lenses 15a, 15b, 15c, 15d, . . . stand side by side along the length direction of the linear area of the stimulable phosphor sheet 13 exposed to the linear stimulating rays 10, i.e. along the main scanning direction indicated by the double headed arrow X in FIG. 1. Each of the distributed index lenses 15a, 15b, 15c, 15d, . . . collects the emitted light 14 having been emitted by the stimulable phosphor sheet 13. Also, as illustrated in FIG. 1 and FIG. 2, each of the distributed index lenses 15a, 15b, 15c, 15d, . . . guides the emitted light 14 toward the light guide device 16.

As illustrated in FIG. 2, the light guide device 16 comprises a light guiding sheet 16F and a light reflecting sheet 16G, which are overlaid one upon the other. The light guide device 16 has an approximately elongated rectangular parallelepiped shape. The light guide device 16 is located such that the longitudinal direction of the light guide device 16 is parallel with the main scanning direction indicated by the double headed arrow X on the stimulable phosphor sheet 13 illustrated in FIG. 1, and such that the one surface 16c on the side of the light guiding sheet 16F stands facing the lens array 15.

Figure 4:
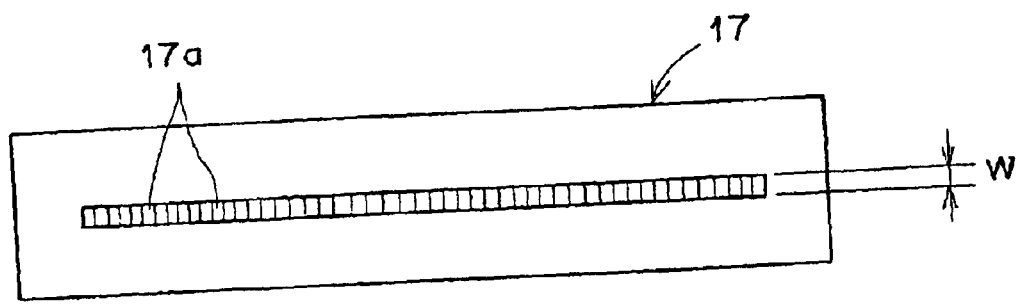
FIG. 4 is a plan view showing a line sensor employed in the first embodiment of FIG. 1.

FIG. 4 is a plan view showing the CCD line sensor 17A employed in the first embodiment of FIG. 1. As illustrated in FIG. 4, the CCD line sensor 17A comprises a plurality of sensor chips (photoelectric conversion devices) 17a, 17a, . . . , which are arrayed in a line. In this embodiment, a light receiving width of the CCD line sensor 17A, which light receiving width is taken in the direction normal to the array direction of the sensor chips 17a, 17a, . . . , i.e. a width W of each of the sensor chips 17a, 17a, . . . , is approximately equal to 25 $\mu$m. The CCD line sensor 17A is in close contact with the end face 16a of the light guiding sheet 16F, which end face is parallel with the longitudinal direction of the light guiding sheet 16F, such that the sensor chips 17a, 17a, . . . stand side by side along the end face 16a.

The light guiding sheet 16F constituting the light guide device 16 is divided into pixels, which are arrayed along the array direction of the sensor chips (the photoelectric conversion devices) 17a, 17a, . . . of the CCD line sensor 17A and at a pitch identical with the array pitch of the sensor chips 17a, 17a, . . .

The CCD line sensor 17B has the same constitution as that of the CCD line sensor 17A. The CCD line sensor 17B is in close contact with the end face 16b of the light guiding sheet 16F, which end face stands facing the end face 16a and is parallel with the longitudinal direction of the light guiding sheet 16F, such that the sensor chips of the CCD line sensor 17B (which sensor chips are of the same type as the sensor chips 17a, 17a, . . . of the CCD line sensor 17A) stand side by side along the end face 16b. Therefore, the light guiding sheet 16F constituting the light guide device 16 is also divided into the pixels at the pitch identical with the array pitch of the sensor chips of the CCD line sensor 17B.

In cases where the stimulable phosphor sheet 13 has a large width, each of the CCD line sensor 17A and the CCD line sensor 17B may be composed of a plurality of line sensors, which are arrayed so as to stand in a row along the length direction of the CCD line sensor.

How the first embodiment of the radiation image read-out apparatus in accordance with the present invention operates will be described hereinbelow.

The stimulable phosphor sheet 13 carries a radiation image of an object stored thereon by, for example, being exposed to radiation carrying radiation image information of the object. The stimulable phosphor sheet 13, on which the radiation image has been stored, is moved by the endless belt 18 at a predetermined speed and in the direction indicated by the arrow Y. Also, the stimulating rays 10 are produced by the laser diode array 11. The stimulating rays 10, which have been produced by the laser diode array 11, are linearly irradiated to an area of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having intensity in accordance with the radiation image having been stored on the stimulable phosphor sheet 13. The emitted light 14, which may be, for example, blue light, is collected by the lens array 15 and enters from the one surface 16c of the light guide device 16 into the light guiding sheet 16F.

The emitted light 14, which has entered into the light guiding sheet 16F, diffuses within the light guiding sheet 16F and travels toward the end face 16a and the end face 16b through repeated total reflection between the two surfaces of the light guiding sheet 16F. The emitted light 14, which has traveled to the end face 16a, is received and photoelectrically detected by the CCD line sensor 17A, which is in close contact with the end face 16a. The emitted light 14, which has traveled to the end face 16b, is received and photoelectrically detected by the CCD line sensor 17B, which is in close contact with the end face 16b. The light reflecting sheet 16G reflects the emitted light 14, which is incident on the interface between the light reflecting sheet 16G and the light guiding sheet 16F at an angle of incidence smaller than a critical angle. The emitted light 14 is thus reflected from the light reflecting sheet 16G into the light guiding sheet 16F.

The stimulating rays 10, which have been reflected from the stimulable phosphor sheet 13 and travel toward the light guide device 16, maybe removed by filtering with a filter.

Alternatively, the light guiding sheet 16F may be imparted with the filtering functions, and the stimulating rays 10, which have been reflected from the stimulable phosphor sheet 13 and travel toward the light guide device 16, may be removed with the filtering functions of the light guiding sheet 16F.

The CCD line sensor 17A photoelectrically detects the emitted light 14 and feeds out the analog light detection signal Sa, which corresponds to the intensity of the emitted light 14 (i.e., which represents the radiation image having been stored on the stimulable phosphor sheet 13). The analog light detection signal Sa is made up of a series of signal components corresponding to the respective the pixels. Also, the CCD line sensor 17B photoelectrically detects the emitted light 14 and feeds out the analog light detection signal Sb, which corresponds to the intensity of the emitted light 14 (i.e., which represents the radiation image having been stored on the stimulable phosphor sheet 13). The analog light detection signal Sb is made up of a series of signal components corresponding to the respective the pixels. The analog light detection signals Sa and Sb are fed into the addition processing circuit 19. The addition processing circuit 19 performs the addition processing on signal components of the analog light detection signals Sa and Sb, which signal components have been obtained from the sensor chips corresponding to an identical site on the linear area of the stimulable phosphor sheet 13 exposed to the linear stimulating rays (i.e., an identical site with respect to the main scanning direction indicated by the double headed arrow X). The addition-processed light detection signal S, which has been obtained from the addition processing performed by the addition processing circuit 19, is amplified by the amplifier 20 and converted by the analog-to-digital converter 21 into the digital image signal D.

Thereafter, the digital image signal D is fed into the image processing unit 22, which performs the image processing, such as gradation processing, on the digital image signal D. The digital image signal D, which has been obtained from the image processing performed by the image processing unit 22, is fed into the image reproducing apparatus 23 and is utilized for reproducing the radiation image, which has been stored on the stimulable phosphor sheet 13, as a visible image. The image reproducing apparatus 23 may be displaying means constituted of a CRT display device, or the like. Alternatively, the image reproducing apparatus 23 may be a recording apparatus for performing light scanning recording on photosensitive film.

How the light guide device 16 operates will hereinbelow be described in detail. The beam diameter of the stimulating rays on the stimulable phosphor sheet 13, which beam diameter is taken in the sub-scanning direction indicated by the arrow Y, falls within the range of approximately 100 $\mu$m to approximately 500 $\mu$m. Also, the light emission width of the emitted light 14 on the stimulable phosphor sheet 13, which light emission width is taken in the sub-scanning direction, falls within the range of approximately 100 $\mu$m to approximately 500 $\mu$m. Further, since the lens array 15 constitutes the erect equi-magnification optical system, the width of the emitted light 14 impinging upon the one surface 16c of the light guide device 16 falls within the range of approximately 100 $\mu$m to approximately 500 $\mu$m. The width W of each of the sensor chips 17a, 17a, . . . of the CCD line sensor 17A illustrated in FIG. 4 and the sensor chips of the CCD line sensor 17B is approximately 100 $\mu$m.

In this embodiment, the emitted light 14, which has been emitted by the stimulable phosphor sheet 13, is caused to enter from the one surface 16c of the light guide device 16 (specifically, from the surface of the light guiding sheet 16F) into the light guiding sheet 16F. Therefore, in cases where the width of the one surface 16c of the light guide device 16 is set to be larger than the light emission width of the emitted light 14 on the stimulable phosphor sheet 13, the emitted light 14, which has been emitted with the comparatively large light emission width falling within the range of approximately 25 $\mu$m to approximately 500 $\mu$m, is capable of being caused to efficiently enter into the light guiding sheet 16F.

Also, the thickness of each of the end face 16a and the end face 16b of the light guiding sheet 16F may be set to be approximately equal to or smaller than the light receiving width of each of the CCD line sensor 17A and the CCD line sensor 17B. In this manner, a large portion or approximately all of the emitted light 14, which is radiated out from the end face 16a, is capable of being received by the CCD line sensor 17A, and a large portion or approximately all of the emitted light 14, which is radiated out from the end face 16b, is capable of being received by the CCD line sensor 17B.

As described above, with the first embodiment of the radiation image read-out apparatus in accordance with the present invention, the emitted light 14 is capable of being detected markedly efficiently. Therefore, the analog light detection signals (read-out image signals) Sa and Sb having a high signal-to-noise ratio are capable of being obtained. As a result, a radiation image having good image quality is capable of being reproduced.

Figure 6:
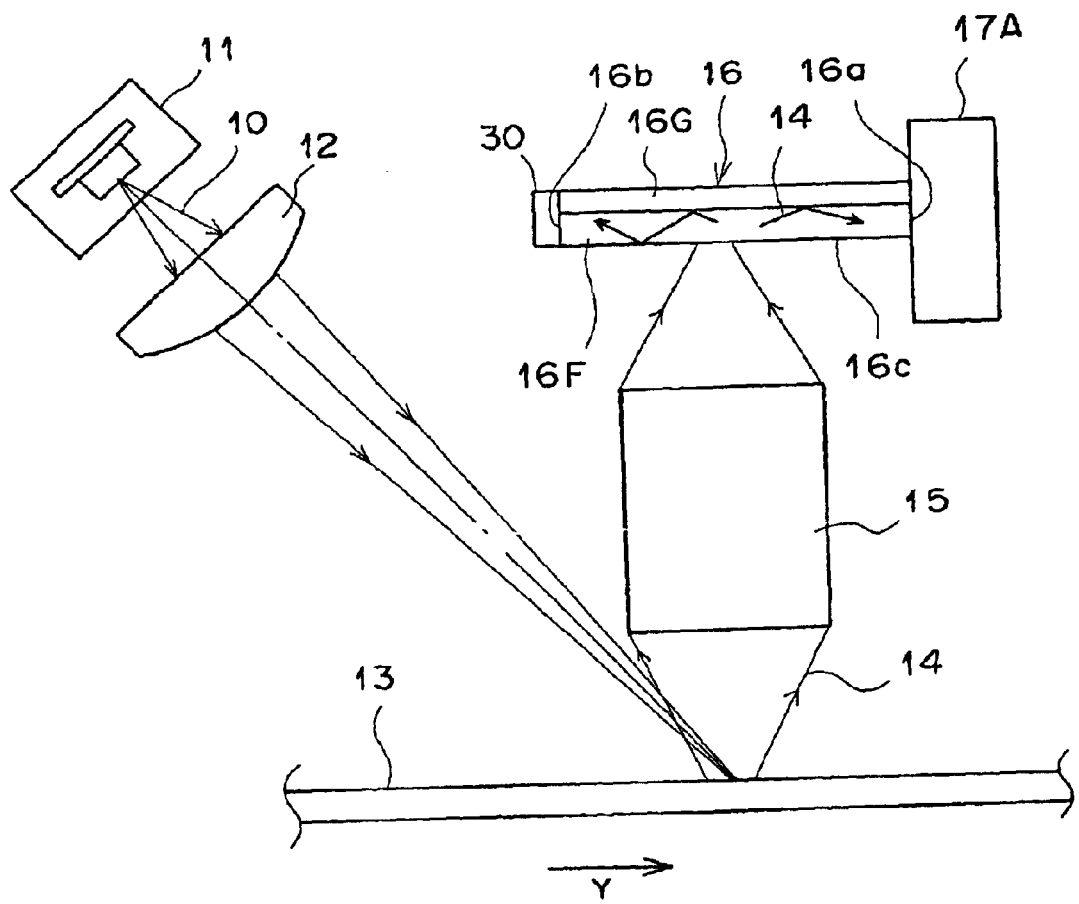
FIG. 6 is a side view showing a read-out optical system employed in a second embodiment of the radiation image read-out apparatus in accordance with the present invention.

A second embodiment of the radiation image read-out apparatus in accordance with the present invention will be described hereinbelow. FIG. 6 is a side view showing a read-out optical system employed in the second embodiment of the radiation image read-out apparatus in accordance with the present invention. In FIG. 6 (and those that follow), similar elements are numbered with the same reference numerals with respect to FIG. 2.

The second embodiment of FIG. 6 is constituted basically in the same manner as that in the first embodiment of FIG. 2, except that the CCD line sensor 17B is not provided and a light reflecting coating layer 30 is formed on the end face 16b of the light guiding sheet 16F. In cases where the light reflecting coating layer 30 is formed, and the end face 16b is constituted as the light reflecting surface, the emitted light 14, which has traveled within the light guiding sheet 16F toward the end face 16b, is reflected from the end face 16b toward the end face 16a and is received and detected by the CCD line sensor 17A.

In the second embodiment of FIG. 6, the addition processing circuit 19 shown in FIG. 1 is not provided. The analog light detection signal Sa, which is obtained from the CCD line sensor 17A, is fed directly into the amplifier 20 illustrated in FIG. 1 and is utilized for reproducing the radiation image.

With the second embodiment of FIG. 6, only one CCD line sensor 17A is utilized as the photodetector, and the emitted light 14 is capable of being detected efficiently. Therefore, the analog light detection signal (the read-out image signal) Sa having a high signal-to-noise ratio is capable of being obtained. As a result, a radiation image having good image quality is capable of being reproduced.

Figure 7:
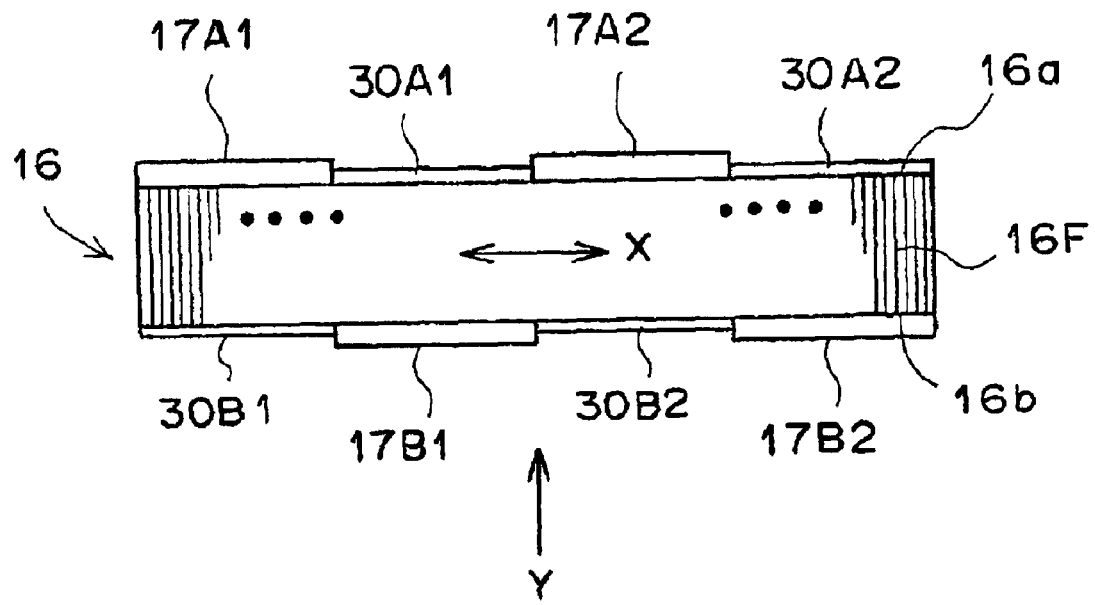
FIG. 7 is a plan view showing part of a read-out optical system employed in a third embodiment of the radiation image read-out apparatus in accordance with the present invention.

A third embodiment of the radiation image read-out apparatus in accordance with the present invention will be described hereinbelow. FIG. 7 is a plan view showing the light guide device 16 employed in the third embodiment of the radiation image read-out apparatus in accordance with the present invention, the plan view being taken from the side of the light guiding sheet 16F.

In the third embodiment of FIG. 7, two CCD line sensors 17A1 and 17A2 are located at a spacing from each other, such that the CCD line sensors 17A1 and 17A2 are in close contact with the end face 16a of the light guiding sheet 16F constituting the light guide device 16. Also, light reflecting coating layers 30A1 and 30A2 are formed at regions of the end face 16a, at which no CCD line sensor is located.

Further, two CCD line sensors 17B1 and 17B2 are located at a spacing from each other, such that the CCD line sensors 17B1 and 17B2 are in close contact with the end face 16b of the light guiding sheet 16F. The CCD line sensor 17B1 is located at the position that stands facing the light reflecting coating layer 30A1. The CCD line sensor 17B2 is located at the position that stands facing the light reflecting coating layer 30A2. Also, light reflecting coating layers 30B1 and 30B2 are formed at regions of the end face 16b, at which no CCD line sensor is located.

In the third embodiment, the emitted light (not shown in FIG. 7), which has been emitted from the main scanning line extending in the main scanning direction indicated by the double headed arrow X, enters from the one surface of the light guiding sheet 16F into the light guiding sheet 16F. The emitted light then travels toward the end face 16a and the end face 16b of the light guiding sheet 16F through repeated total reflection between the two surfaces of the light guiding sheet 16F and is received and detected by the CCD line sensors 17A1, 17B1, 17A2, and 17B2. The light detection signal components, which have been obtained from the CCD line sensors 17A1, 17B1, 17A2, and 17B2, are combined with one another in order to form the light detection signal, which corresponds to one main scanning line. The thus obtained light detection signal is utilized for reproducing the radiation image.

In such cases, for example, the emitted light, which has traveled toward the side (the lower side in FIG. 7) opposite to the CCD line sensor 17A1, is reflected from the light reflecting coating layer 30B1, which is formed at the region of the end face 16b, toward the CCD line sensor 17A1 and is received and detected by the CCD line sensor 17A1. Therefore, the emitted light is capable of being detected efficiently. The same effects are also obtained with the CCD line sensors 17B1, 17A2, and 17B2.

Figure 8:
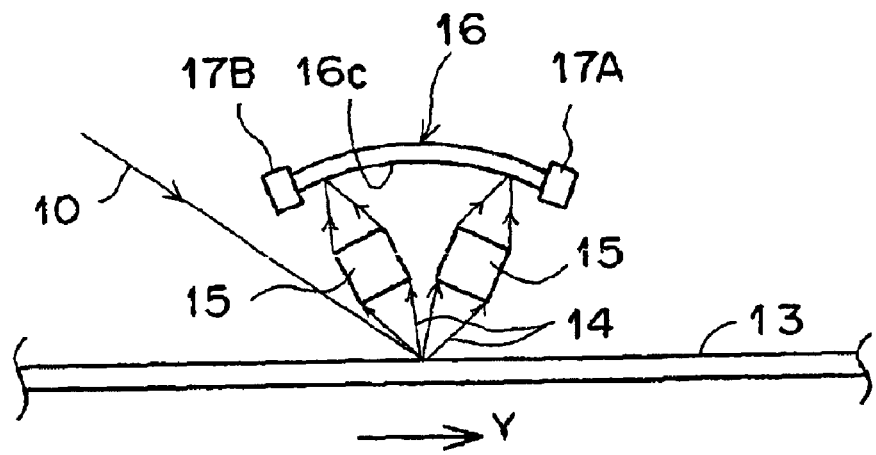
FIG. 8 is a side view showing a read-out optical system employed in a fourth embodiment of the radiation image read-out apparatus in accordance with the present invention.

A fourth embodiment of the radiation image read-out apparatus in accordance with the present invention will be described hereinbelow. FIG. 8 is a side view showing a read-out optical system employed in the fourth embodiment of the radiation image read-out apparatus in accordance with the present invention. The fourth embodiment of FIG. 8 is constituted basically in the same manner as that in the first embodiment of FIG. 2, except that two lens arrays 15, 15, which act as the light collecting optical systems for collecting the emitted light 14, are located so as to stand side by side in the sub-scanning direction indicated by the arrow Y.

In the same manner as that in the first embodiment of FIG. 2, the emitted light 14, which has been collected by the lens arrays 15, 15, is guided through the light guide device 16 toward the two CCD line sensors 17A and 17B and detected by the CCD line sensors 17A and 17B. In cases where a plurality of the light collecting optical systems are thus located between the stimulable phosphor sheet 13 and the light guide device 16, the emitted light 14 is capable of being collected more efficiently.

A fifth embodiment of the radiation image read-out apparatus in accordance with the present invention will be described hereinbelow. FIG. 9 is a side view showing a read-out optical system employed in the fifth embodiment of the radiation image read-out apparatus in accordance with the present invention. The fifth embodiment of FIG. 9 is constituted basically in the same manner as that in the first embodiment of FIG. 2, except that a fluorescent light guiding sheet 46 is employed in lieu of the light guide device 16.

The fluorescent light guiding sheet 46 contains fine particles of a fluorescent material in a dispersed form. The fluorescent light guiding sheet 46 has an elongated shape. The fluorescent light guiding sheet 46 is located in an orientation such that the longitudinal direction of the fluorescent light guiding sheet 46 is parallel with the main scanning direction on the stimulable phosphor sheet 13 (i.e., the direction normal to the plane of the sheet of FIG. 9), and such that one surface 46c of the fluorescent light guiding sheet 46 stands facing the lens array 15. The CCD line sensor 17A is located such that it is in close contact with an end face 46a of the fluorescent light guiding sheet 46, which end face is parallel with the longitudinal direction of the fluorescent light guiding sheet 46. Also, the CCD line sensor 17B is located such that it is in close contact with an end face 46b of the fluorescent light guiding sheet 46, which end face is parallel with the longitudinal direction of the fluorescent light guiding sheet 46.

In the fifth embodiment of FIG. 9, when the emitted light 14 enters from the one surface 46c of the fluorescent light guiding sheet 46 into the fluorescent light guiding sheet 46, the fluorescent material dispersed in the fluorescent light guiding sheet 46 is excited by the emitted light 14 to produce fluorescence 40. The fluorescence 40 travels toward the end face 46a and the end face 46b through repeated total reflection between the two surfaces of the fluorescent light guiding sheet 46. The fluorescence 40 is thus received and detected by the CCD line sensors 17A and 17B.

The light detection signals, which are obtained from the CCD line sensors 17A and 17B, represent the intensity of the fluorescence 40. The intensity of the fluorescence 40 is in proportion to the intensity of the emitted light 14. Consequently, the light detection signals, which are obtained from the CCD line sensors 17A and 17B, represent the radiation image having been stored on the stimulable phosphor sheet 13. In the same manner as that in the first embodiment of FIG. 1, the light detection signals, which have been obtained from the CCD line sensors 17A and 17B, are then subjected to the processing performed by the addition processing circuit 19, the amplifier 20, the analog-to-digital converter 21, and the image processing unit 22 shown in FIG. 1. The image signal having been obtained from the image processing unit 22 is utilized for reproducing the radiation image.

In cases where the fluorescent light guiding sheet 46 described above is utilized as the light guide device, the constitution illustrated in FIG. 6 or FIG. 7 may be employed as for the location of the line sensor. Also, as illustrated in FIG. 8, a plurality of the light collecting optical systems may be employed.

In the aforesaid embodiments of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. With the proposed stimulable phosphor sheet, such that the functions for absorbing radiation and the functions for storing energy from the radiation may be separated from each other, the stimulable phosphor sheet is provided with a layer of a stimulable phosphor for energy storage. In cases where the stimulable phosphor sheet provided with the layer of the stimulable phosphor for energy storage is utilized, the detection quantum efficiency in the formation of the radiation image, i.e., the radiation absorptivity, the light emission efficiency, the emitted light pickup efficiency, and the like, is capable of being enhanced as a whole. Therefore, the image quality of the reproduced image is capable of being enhanced even further.

Further, the stimulable phosphor sheet employed in the aforesaid embodiments of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

What is claimed is:

1. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein at least one line sensor is located at a region of one end face of the light guide device, such that the at least one line sensor is capable of detecting the light, which is emitted from a subarea of the linear area of the stimulable phosphor sheet exposed to the linear stimulating rays,
   a region of the one end face of the light guide device, at which region no line sensor is located, is formed as a light reflecting surface,
   at least one line sensor is located at a region of a different end face of the light guide device, which different end face stands facing the one end face of the light guide device, such that the at least one line sensor stands facing the region of the one end face of the light guide device, which region is formed as the light reflecting surface, and
   a region of the different end face of the light guide device, at which region no line sensor is located, is formed as a light reflecting surface.

2. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein the light guide device is divided into pixels, which are arrayed along an array direction of the photoelectric conversion devices of the line sensor and at a pitch identical with an array pitch of the photoelectric conversion devices.

3. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light, which has been emitted from the linear area of the stimulable phosphor sheet exposed to the linear stimulating rays, is collected with a light collecting optical system, and the emitted light, which has thus been collected, is guided by the light collecting optical system toward the light guide device.

4. A method as defined in claim 3 wherein the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

5. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein at least one line sensor is located at a region of one end face of the light guide device, such that the at least one line sensor is capable of detecting the light, which is emitted from a subarea of the linear area of the stimulable phosphor sheet exposed to the linear stimulating rays, a region of the one end face of the light guide device, at which region no line sensor is located, is formed as a light reflecting surface, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as a light reflecting surface.

6. A radiation image read-out apparatus comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light guide device is divided into pixels, which are arrayed along an array direction of the photoelectric conversion devices of the line sensor and at a pitch identical with an array pitch of the photoelectric conversion devices.

7. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the apparatus further comprises a light collecting optical system, which is located between the stimulable phosphor sheet and the light guide device, the light collecting optical system collecting the light, which has been emitted from the linear area of the stimulable phosphor sheet exposed to the linear stimulating rays, and guiding the emitted light, which has thus been collected, toward the light guide device.

8. An apparatus as defined in claim 7 wherein the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

9. A radiation image read-out method, comprising the steps of:
i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
iii) detecting the emitted light, which has been radiated out from at least one end face of the light guide device, with a line sensor, which comprises a plurality of photoelectric conversion devices arrayed along the at least one end face of the light guide device, and
iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light guide device is divided into a plurality of sections along the length direction, wherein each section channels a portion of the light received toward the end faces of the light guide device.

10. A radiation image read-out method, comprising the steps of:
i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
iii) detecting the emitted light, which has been radiated out from at least one end face of the light guide device, with a line sensor, which comprises a plurality of photoelectric conversion devices arrayed along the at least one end face of the light guide device, and
iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
wherein each of two line sensors is capable of detecting the light which is emitted from a subarea of the linear area of the stimulable phosphor sheet exposed to the linear stimulating rays.

11. A radiation image read-out method, comprising the steps of:
i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
iii) detecting the emitted light, which has been radiated out from at least one end face of the light guide device, with a line sensor, which comprises a plurality of photoelectric conversion devices arrayed alone the at least one end face of the light guide device, and
iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
wherein the end faces are disposed substantially parallel to the linear area of the stimulable phosphor sheet exposed to the linear stimulating rays.

12. A radiation image read-out method, comprising the steps of:
i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
iii) detecting the emitted light, which has been radiated out from at least one end face of the light guide device, with a line sensor, which comprises a plurality of photoelectric conversion devices arrayed along the at least one end face of the light guide device, and
iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
wherein a first end face of the end faces is disposed at an upstream end of the light guide device and a second end face of the end faces is disposed at a downstream end of the light guide device.

13. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and
   outputs of photoelectric conversion devices of the two line sensors, which photoelectric conversion devices correspond to an identical site on the linear area of the stimulable phosphor sheet exposed to the linear stimulating rays, are added to each other, and
   wherein the light guide device is divided into a plurality of sections along the length direction, wherein each section channels a portion of the light received toward the end faces of the light guide device.

14. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and
   outputs of photoelectric conversion devices of the two line sensors, which photoelectric conversion devices correspond to an identical site on the linear area of the stimulable phosphor sheet exposed to the linear stimulating rays, are added to each other, and
   wherein each of two line sensors is capable of detecting the light which is emitted from a subarea of the linear area of the stimulable phosphor sheet exposed to the linear stimulating rays.

15. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed alone the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein the line sensor is located at one end face of the light guide device, such that the line sensor is capable of detecting the light, which is emitted from an approximately overall length of the linear area of the stimulable phosphor sheet exposed to the linear stimulating rays, and
   an end face of the light guide device, the end face being located on a side opposite to the one end face at which the line sensor is located, is formed as a light reflecting surface, and
   wherein the light guide device is divided into a plurality of sections along the length direction, wherein each section channels a portion of the light received toward the end faces of the light guide device.

16. A radiation image read-out method, comprising the steps of:
   i) linearly irradiating stimulating rays onto an area of a stimulable phosphor sheet, on which a radiation image has been stored, with stimulating ray irradiating means, the stimulating rays causing the stimulable phosphor sheet to emit light in proportion to an amount of energy stored thereon during its exposure to radiation,
   ii) receiving the light, which has been emitted from the linear area of the stimulable phosphor sheet exposed to the linear stimulating rays, with one surface of a light guide device, which is located such that the one surface stands facing the linear area of the stimulable phosphor sheet exposed to the linear stimulating rays, the emitted light, which has thus been received, being guided through the light guide device toward end faces of the light guide device,
   iii) detecting the emitted light, which has been radiated out from at least one end face of the light guide device, with a line sensor, which comprises a plurality of photoelectric conversion devices arrayed along the at least one end face of the light guide device, and
   iv) moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein the line sensor is located at one end face of the light guide device, such that the line sensor is capable of detecting the light, which is emitted from an approximately overall length of the linear area of the stimulable phosphor sheet exposed to the linear stimulating rays, and
   an end face of the light guide device, the end face being located on a side opposite to the one end face at which the line sensor is located, is formed as a light reflecting surface, and
   wherein the line sensor is capable of detecting the light which is emitted from a subarea of the linear area of the stimulable phosphor sheet exposed to the linear stimulating rays.

17. A radiation image read-out apparatus, comprising:
   i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
   ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device,
   iii) a line sensor, which comprises a plurality of photoelectric conversion devices arrayed along at least one end face of the light guide device, the line sensor detecting the emitted light, which has been radiated out from the at least one end face of the light guide device, and
   iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein the light guide device is divided into a plurality of sections along the length direction, wherein each section channels a portion of the light received and converts the portion into fluorescence, toward the end faces of the light guide device.

18. A radiation image read-out apparatus, comprising:
   i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
   ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device,
   iii) a line sensor, which comprises a plurality of photoelectric conversion devices arrayed along at least one end face of the light guide device, the line sensor detecting the emitted light, which has been radiated out from the at least one end face of the light guide device, and
   iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays,
   wherein each of two line sensors is capable of detecting the light which is emitted from a subarea of the linear area of the stimulable phosphor sheet exposed to the linear stimulating rays.

19. A radiation image read-out apparatus, comprising:
   i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation,
   ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device,
   iii) a line sensor, which comprises a plurality of photoelectric conversion devices arrayed alone at least one end face of the light guide device, the line sensor detecting the emitted light, which has been radiated out from the at least one end face of the light guide device, and
   iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the end faces are disposed substantially parallel to the linear area of the stimulable phosphor sheet exposed to the linear stimulating rays.

20. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein a first end face of the end faces is disposed at an upstream end of the light guide device and a second end face of the end faces is disposed at a downstream end of the light guide device.

21. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein at least one line sensor is located at a region of one end face of the light guide device, such that the at least one line sensor is capable of detecting the light, which is emitted from a subarea of the linear area of the stimulable phosphor sheet exposed to the linear stimulating rays, a region of the one end face of the light guide device, at which region no line sensor is located, is formed as a light reflecting surface, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as a light reflecting surface.

22. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light guide device is divided into pixels, which are arrayed along an array direction of the photoelectric conversion devices of the line sensor and at a pitch identical with an array pitch of the photoelectric conversion devices.

23. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photo-electric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light, which has been emitted from the linear area of the stimulable phosphor sheet exposed to the linear stimulating rays, is collected with a light collecting optical system, and the emitted light, which has thus been collected, is guided by the light collecting optical system toward the light guide device.

24. An apparatus as defined in claim 23 wherein the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

25. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device, converting the emitted light, which has thus been received, into fluorescence, and guiding the fluorescence toward end faces of the light guide device, iii) a line sensor, which comprises a plurality of photo-electric conversion devices arrayed along at least one end face of the light guide device, the line sensor detecting the fluorescence, which has been radiated out from the at least one end face of the light guide device, and thereby indirectly detecting the emitted light, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein at least one line sensor is located at a region of one end face of the light guide device, such that the at least one line sensor is capable of detecting the light, which is emitted from a subarea of the linear area of the stimulable phosphor sheet exposed to the linear stimulating rays, a region of the one end face of the light guide device, at which region no line sensor is located, is formed as a light reflecting surface, at least one line sensor is located at a region of a different end face of the light guide device, which different end face stands facing the one end face of the light guide device, such that the at least one line sensor stands facing the region of the one end face of the light guide device, which region is formed as the light reflecting surface, and a region of the different end face of the light guide device, at which region no line sensor is located, is formed as a light reflecting surface.

26. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device, converting the emitted light, which has thus been received, into fluorescence, and guiding the fluorescence toward end faces of the light guide device, iii) a line sensor, which comprises a plurality of photo-electric conversion devices arrayed along at least one end face of the light guide device, the line sensor detecting the fluorescence, which has been radiated out from the at least one end face of the light guide device, and thereby indirectly detecting the emitted light, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the light guide device is divided into pixels, which are arrayed along an array direction of the photoelectric conversion devices of the line sensor and at a pitch identical with an array pitch of the photoelectric conversion devices.

27. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device, converting the emitted light, which has thus been received, into fluorescence, and guiding the fluorescence toward end faces of the light guide device, iii) a line sensor, which comprises a plurality of photo-electric conversion devices arrayed along at least one end face of the light guide device, the line sensor detecting the fluorescence, which has been radiated out from the at least one end face of the light guide device, and thereby indirectly detecting the emitted light, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the apparatus further comprises a light collecting optical system, which is located between the stimulable phosphor sheet and the light guide device, the light collecting optical system collecting the light, which has been emitted from the linear area of the stimulable phosphor sheet exposed to the linear stimulating rays, and guiding the emitted light, which has thus been collected, toward the light guide device.

28. An apparatus as defined in claim 27 wherein the light, which has been emitted from the linear area of the stimulable phosphor sheet exposed to the linear stimulating rays, is collected with a plurality of light collecting optical systems, and the emitted light, which has thus been collected, is guided by each of the light collecting optical systems toward the light guide device.

29. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and outputs of photoelectric conversion devices of the two line sensors, which photoelectric conversion devices correspond to an identical site on the linear area of the stimulable phosphor sheet exposed to the linear stimulating rays, are added to each other, and wherein the light guide device is divided into a plurality of sections along the length direction, wherein each section channels a portion of the light received toward the end faces of the light guide device.

30. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the line sensor is located at one end face of the light guide device, such that the line sensor is capable of detecting the light, which is emitted from an approximately overall length of the linear area of the stimulable phosphor sheet exposed to the linear stimulating rays, and an end face of the light guide device, the end face being located on a side opposite to the one end face at which the line sensor is located, is formed as a light reflecting surface, and wherein the light guide device is divided into a plurality of sections along the length direction, wherein each section channels a portion of the light received toward the end faces of the light guide device.

31. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein each of two line sensors is located at one of two end faces of the light guide device, which end faces stand facing each other, such that each of the two line sensors is capable of detecting the light, which is emitted from an approximately overall length of the linear area of the stimulable phosphor sheet exposed to the linear stimulating rays, and outputs of photoelectric conversion devices of the two line sensors, which photoelectric conversion devices correspond to an identical site on the linear area of the stimulable phosphor sheet exposed to the linear stimulating rays, are added to each other, and wherein each of the two line sensors is capable of detecting the light which is emitted from a subarea of the linear area of the stimulable phosphor sheet exposed to the linear stimulating rays.

32. A radiation image read-out apparatus, comprising:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a light guide device, which is located such that one surface stands facing the linear area of the stimulable phosphor sheet exposed to the linear stimulating rays, the light guide device receiving the light, which has been emitted from the linear area of the stimulable phosphor sheet exposed to the linear stimulating rays, with the one surface of the light guide device and guiding the emitted light, which has thus been received, toward end faces of the light guide device, iii) a line sensor, which comprises a plurality of photoelectric conversion devices arrayed along at least one end face of the light guide device, the line sensor detecting the emitted light, which has been radiated out from the at least one end face of the light guide device, and iv) sub-scanning means for moving the stimulable phosphor sheet with respect to the stimulating ray irradiating means, the light guide device, and the line sensor and in a direction, which is approximately normal to a length direction of the linear area of the stimulable phosphor sheet exposed to the linear stimulating rays, wherein the line sensor is located at one end face of the light guide device, such that the line sensor is capable of detecting the light, which is emitted from an approximately overall length of the linear area of the stimulable phosphor sheet exposed to the linear stimulating rays, and an end face of the light guide device, the end face being located on a side opposite to the one end face at which the line sensor is located, is formed as a light reflecting surface, and wherein the line sensor is capable of detecting the light which is emitted from a subarea of the linear area of the stimulable phosphor sheet exposed to the linear stimulating rays.

* * * * *